(12) United States Patent
Mandokoro

(10) Patent No.: US 9,989,386 B2
(45) Date of Patent: Jun. 5, 2018

(54) MOUNTING STRUCTURE OF A POSITION DETECTING SENSOR

(71) Applicant: SMC CORPORATION, Chiyoda-ku (JP)

(72) Inventor: Jiro Mandokoro, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days. days.

(21) Appl. No.: 15/352,208

(22) Filed: Nov. 15, 2016

(65) Prior Publication Data

US 2017/0153131 A1    Jun. 1, 2017

(30) Foreign Application Priority Data

Dec. 1, 2015   (JP) .................. 2015-234539

(51) Int. Cl.
  *G01D 5/14*      (2006.01)
  *G01D 11/30*     (2006.01)

(52) U.S. Cl.
  CPC ............. *G01D 11/30* (2013.01); *G01D 5/14* (2013.01)

(58) Field of Classification Search
  CPC ........ G01D 11/30; G01D 5/14; G01D 11/245; G01D 5/12; F15B 11/08; F15B 19/005; F15B 2211/857; F15B 15/2861; F15B 15/2892
  USPC .................................................. 324/207.24
  See application file for complete search history.

(56) References Cited

U.S. PATENT DOCUMENTS

| 7,250,753 B2 * | 7/2007 | Terasaki ............. F15B 15/2807 324/207.21 |
| 9,696,186 B2 * | 7/2017 | Mandokoro ......... G01D 11/245 |
| 2002/0014128 A1 * | 2/2002 | Kroll .................. F15B 15/2807 73/866.5 |
| 2005/0231197 A1 * | 10/2005 | Reininger .......... F15B 15/2807 324/251 |
| 2008/0022789 A1 * | 1/2008 | Okuno ................ F15B 15/2892 73/866.5 |
| 2009/0025551 A1 * | 1/2009 | Terasaki ............. F15B 15/2892 92/5 R |

FOREIGN PATENT DOCUMENTS

| DE | 102013011667 A1 * | 1/2015 | ............ G01D 11/30 |
| JP | 2008-51800 | 3/2008 | |

* cited by examiner

*Primary Examiner* — Jay Patidar
(74) *Attorney, Agent, or Firm* — Oblon, McClelland, Maier & Neustadt, L.L.P.

(57) ABSTRACT

A position detecting sensor is mounted in a sensor attachment groove of a cylinder device. The sensor attachment groove includes a wide portion on the side of a groove bottom surface, and a narrow portion on the side of a side surface of the cylinder device. The position detecting sensor includes a mounting member having a width dimension larger than a groove width of the narrow portion. The mounting member includes a first engagement part and a second engagement part, which are flexible and are arranged in confronting relation, opening with a gap mutually therebetween in a widthwise direction of the sensor attachment groove.

6 Claims, 7 Drawing Sheets

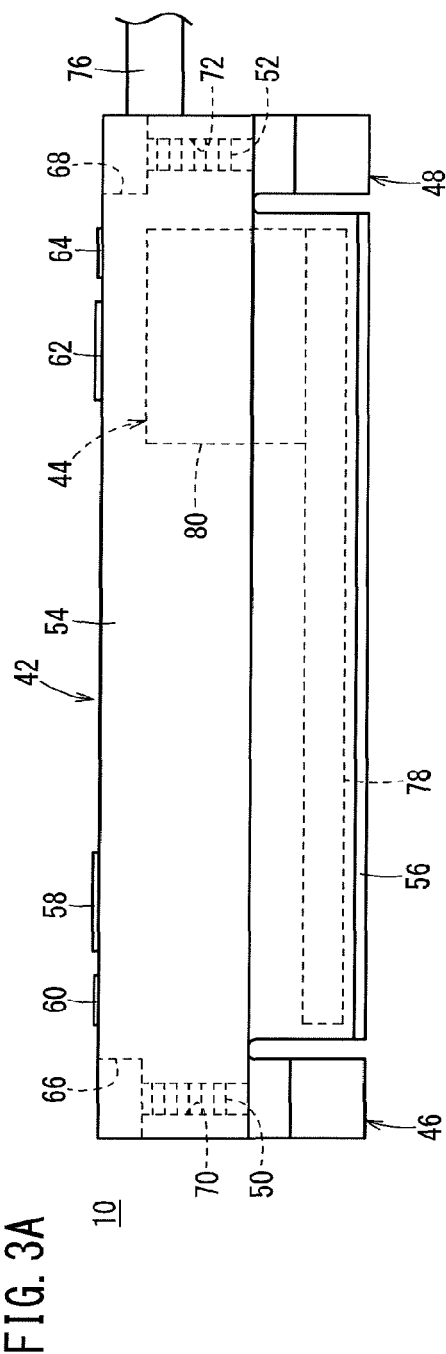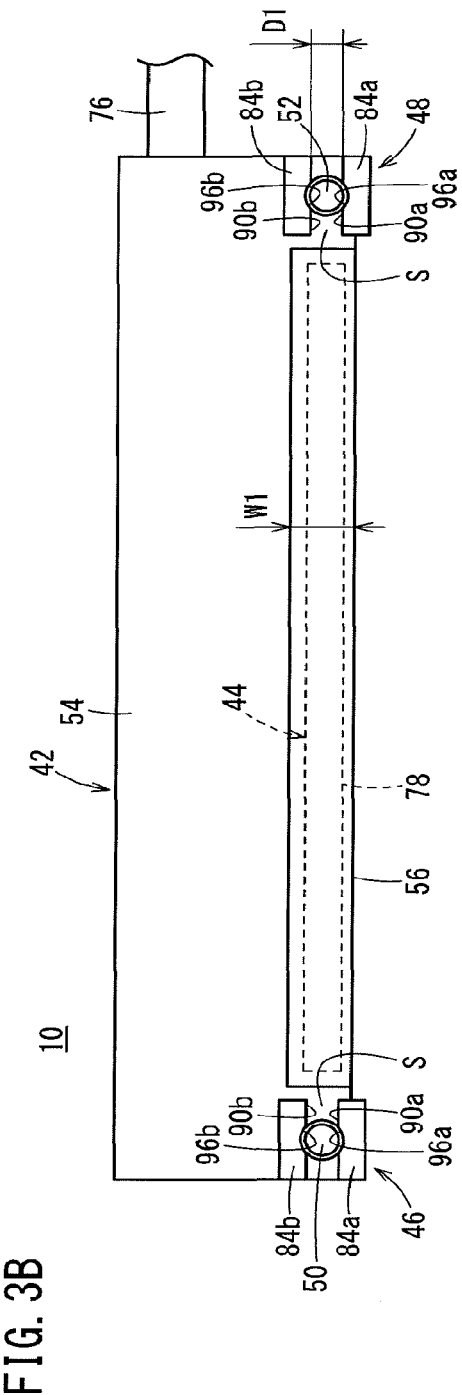

MOUNTING STRUCTURE OF A POSITION DETECTING SENSOR

CROSS-REFERENCE TO RELATED APPLICATION

This application is based upon and claims the benefit of priority from Japanese Patent Application No. 2015-234539 filed on Dec. 1, 2015, the contents of which are incorporated herein by reference.

BACKGROUND OF THE INVENTION

Field of the Invention

The present invention relates to a position detecting sensor which is mounted in a sensor attachment groove that opens on a side surface of an actuator and extends along an axial direction of the actuator.

Description of the Related Art

Conventionally, for detecting the position of a piston in the interior of a cylinder that constitutes part of an actuator, a magnet is installed on the piston, and a magnetic sensor that detects magnetism from the magnet is arranged on an outer side of the actuator. The piston is reciprocally operated under the supply of a pressure fluid, and the position of the piston is confirmed by magnetism from the magnet that is detected by the magnetic sensor.

In this case, the position detecting sensor is constructed by connecting a cylindrical columnar shaped mounting member to a holder in which the magnetic sensor is accommodated, and the position detecting sensor is mounted in a sensor groove that is circular in cross section and opens along the entire length in an axial direction in a side surface of the cylinder (see, for example, Japanese Laid-Open Patent Publication No. 2008-051800).

When the position detecting sensor is mounted, at first, in a state in which the holder and the mounting member are connected together by a connecting bolt, the mounting member is inserted into the sensor groove from an end surface in the axial direction of the cylinder, and is moved to a predetermined position along the sensor groove. Thereafter, an amount of tightening of the connecting bolt is adjusted, and attachment of the position detecting sensor is completed by a bulging part, which is formed in an opening of the sensor groove, being sandwiched between the holder and the mounting member.

SUMMARY OF THE INVENTION

However, with the position detecting sensor disclosed in Japanese Laid-Open Patent Publication No. 2008-051800, mounting of the position detecting sensor with respect to the cylinder by insertion of the mounting member is performed manually up to a desired position from one end in the axial direction of the cylinder, in a state with the mounting member and the holder being connected together by the connecting bolt. Therefore, an improvement in operational efficiency is not easily achieved, while additionally, constraints are imposed such as requiring a large operating space near the axial end of the cylinder.

The present invention has been devised taking into consideration the aforementioned problems, and has the object of providing a position detecting sensor which enables a mounting operation to be carried out easily and efficiently with respect to an actuator, and without the need for a large operating space in the vicinity of an end in the axial direction of the actuator.

For achieving the above object, the position detecting sensor according to the present invention is mounted in a sensor attachment groove that opens on a side surface of an actuator and extends along an axial direction of the actuator, the sensor attachment groove including a wide portion on a groove bottom surface side, and a narrow portion on a side surface side of the actuator, the position detecting sensor comprising a housing in which there is accommodated a sensor main body that detects a position of a displaceable body of the actuator, and a mounting member provided on the housing, and having a width dimension larger than a groove width of the narrow portion of the sensor attachment groove. The mounting member includes a first engagement part and a second engagement part, which are flexible and are arranged in confronting relation, opening with a gap mutually therebetween in a widthwise direction of the sensor attachment groove.

In accordance with the above configuration, in a state in which the first engagement part and the second engagement part are flexed in such a manner that the first engagement part and the second engagement part approach one another mutually, by being restored to their original positions after insertion thereof into the sensor attachment groove from the side surface of the actuator, the position detecting sensor can be attached and mounted with respect to the actuator. Owing thereto, mounting of the position detecting sensor can be carried out easily and efficiently with respect to an actuator, without the need for a large operating space in the vicinity of an end in the axial direction of the actuator.

The position detecting sensor may be equipped with a fixing tool arranged in the gap, and which presses the first engagement part and the second engagement part in directions to separate away from each other.

In accordance with the above configuration, the first engagement part and the second engagement part are pressed by the fixing tool in directions to separate away from each other, whereby the position detecting sensor can be fixed more stably and reliably with respect to the actuator. Further, flexure of the first engagement part and the second engagement part in directions to approach one another can be suppressed by the fixing tool.

In the above-described position detecting sensor, a penetrating hole for guiding the fixing tool toward the gap may be formed in the housing.

In accordance with such a configuration, through the penetrating hole, the fixing tool can easily be disposed in the gap between the first engagement part and the second engagement part.

In the above-described position detecting sensor, retaining members for retaining the fixing tool may be provided respectively on a first confronting surface within the first engagement part and confronting the second engagement part, and a second confronting surface within the second engagement part and confronting the first engagement part.

In accordance with such a configuration, the fixing tool can be retained reliably between the first engagement part and the second engagement part.

In the above-described position detecting sensor, the first engagement part may include a first extension that extends in a straight line from the housing, and a first bulging part provided on a distal end of the first extension, and which bulges outwardly on a side opposite to the second engagement part. In addition, the second engagement part may include a second extension that extends in a straight line from the housing, and a second bulging part provided on a distal end of the second extension, and which bulges outwardly on a side opposite to the first engagement part.

In accordance with the above structure, disengagement of the mounting member from the sensor attachment groove can suitably be suppressed by the first bulging part and the second bulging part.

In the above-described position detecting sensor, transverse cross sections of the first bulging part and the second bulging part may be defined by respective arc-shaped curved surfaces.

In accordance with such a structure, in a state in which the arc-shaped curved surfaces are placed in contact with edge parts of the opening of the sensor attachment groove, by pressing the mounting member toward the sensor attachment groove, the mounting member can be inserted easily into the interior of the sensor attachment groove. Further, the mounting member can easily be taken out from the sensor attachment groove by pulling out the mounting member that is arranged inside the sensor attachment groove.

In the above-described position detecting sensor, the housing may extend in one direction. Further, two of the mounting members may be provided, and the respective mounting members may be disposed respectively on opposite ends in the longitudinal direction of the housing.

In accordance with this configuration, the position detecting sensor can be fixed more reliably and stably with respect to the actuator.

In the above-described position detecting sensor, the housing may comprise a housing main body, and a sensor arrangement section provided on the housing main body at a position between the two mounting members, and in which the sensor main body is arranged. The sensor arrangement section may be formed to be insertable into the interior of the sensor attachment groove from the side surface of the actuator, and so that the sensor main body is positioned inside the sensor attachment groove.

In accordance with the above configuration, since the sensor main body can be positioned inside the sensor attachment groove, the distance between the displaceable body and the sensor main body can be a relatively close distance. Accordingly, the detection accuracy of the position detecting sensor can be enhanced. Further, since the sensor arrangement section is positioned between the two mounting members, the sensor arrangement section (sensor main body) can be fixed more stably and reliably with respect to the actuator.

According to the present invention, in a state in which the first engagement part and the second engagement part are flexed in such a manner that the first engagement part and the second engagement part approach one another mutually, since they can be restored to their original positions after insertion thereof into the sensor attachment groove from the side surface of the actuator, the position detecting sensor can easily and efficiently be attached with respect to the actuator, without the need for a large operating space.

The above and other objects, features and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3A is a side view of the position detecting sensor of FIG. 2;

FIG. 3B is a rear view of the position detecting sensor of FIG. 2;

DESCRIPTION OF THE PREFERRED EMBODIMENTS

Below, a preferred embodiment concerning a position detecting sensor according to the present invention in relation to a cylinder device on which the positioning detecting sensor is mounted will be described in detail with reference to the accompanying drawings.

Figure 1:
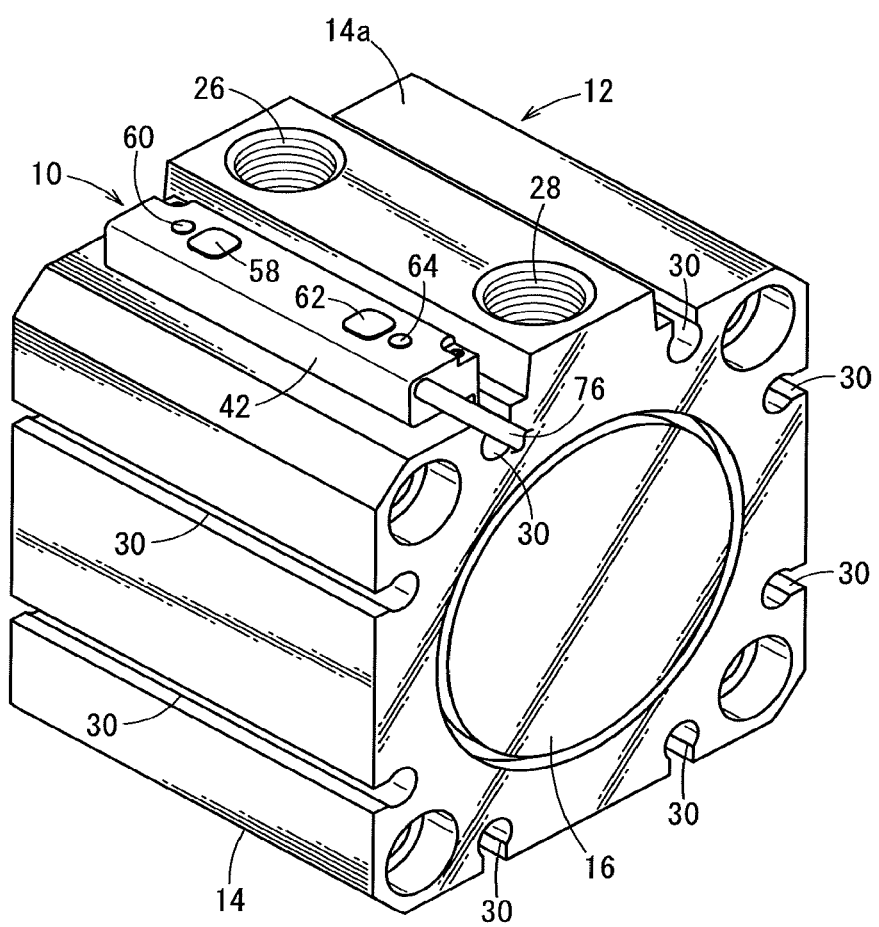
FIG. 1 is a perspective view showing a condition in which a position detecting sensor according to an embodiment of the present invention is mounted on a cylinder device.

At first, the basic configuration of a cylinder device (actuator) 12 will be described. As shown in FIG. 1, the cylinder device 12 is equipped with a metallic cylinder tube 14 formed in a tubular shape, and a pair of end plates 16 that close the openings on ends in the axial direction of the cylinder tube 14.

A non-illustrated piston (displaceable body), which is displaced along the axial direction of the cylinder tube 14 under the supply of a pressure fluid, is disposed in an interior hole of the cylinder tube 14, and a non-illustrated piston rod is connected to the piston. An annular magnet, not shown, is mounted on an outer circumferential surface of the piston.

The cylinder tube 14 includes an outer rectangular shape, and a pair of ports 26, 28 for supplying and discharging a pressure fluid is formed on a side surface 14a of the cylinder tube 14. Two sensor attachment grooves 30 in which the position detecting sensor 10 is mounted are formed in each of the respective side surfaces 14a of the cylinder tube 14.

The respective sensor attachment grooves 30 open on side surfaces 14a of the cylinder tube 14, and extend across the entire length along the axial direction of the cylinder tube 14. Stated otherwise, the respective sensor attachment grooves 30 open on opposite end surfaces of the cylinder tube 14.

Figure 4:
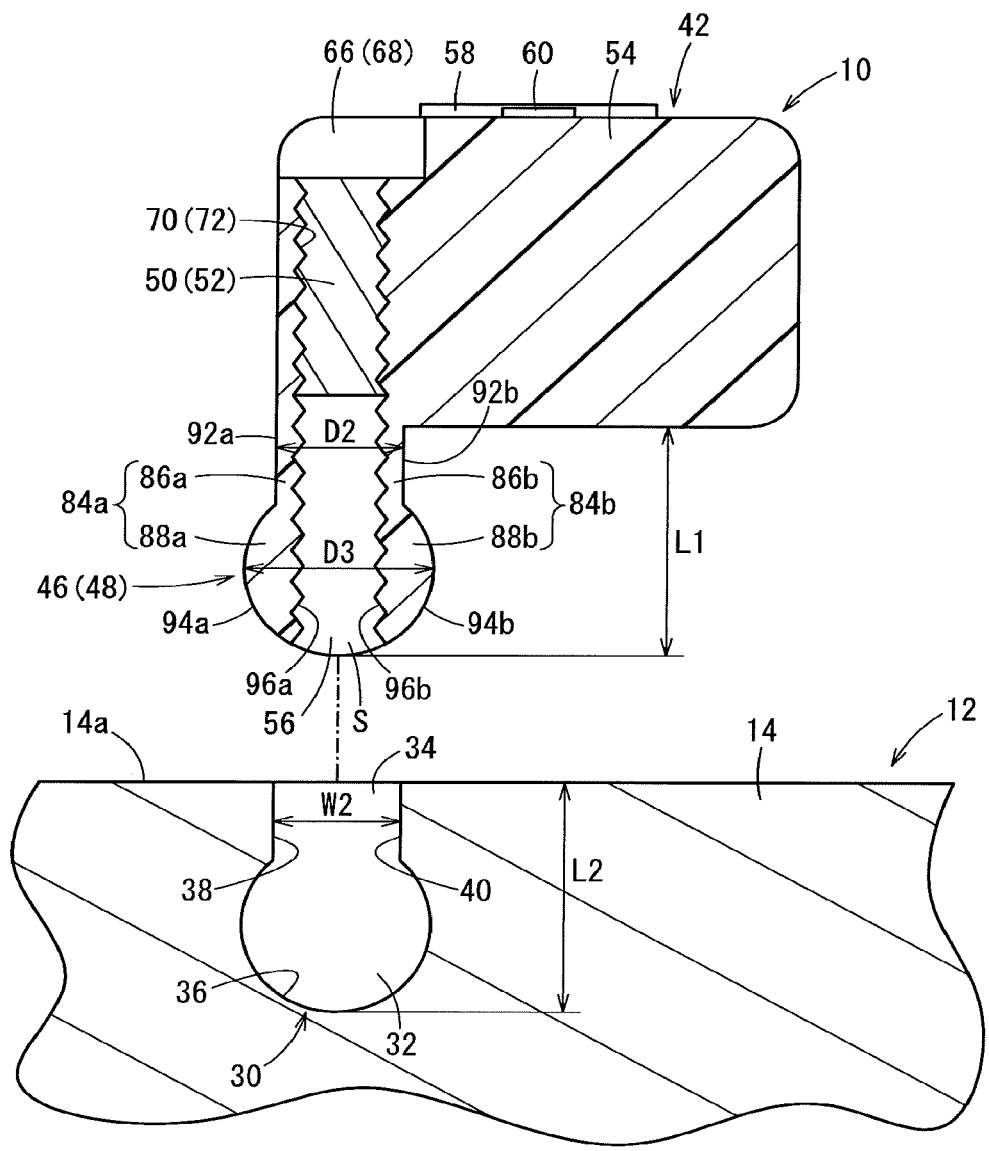
FIG. 4 is a first explanatory drawing of a mounting procedure for attaching the position detecting sensor with respect to a cylinder device.

As shown in FIG. 4, the respective sensor attachment grooves 30 each include a wide portion 32 positioned on the side of a groove bottom surface, and a narrow portion 34 positioned on the side of a side surface 14a of the cylinder tube 14. The wide portion 32 is formed with a circular shape in transverse cross section by the arc-shaped curved surface 36. The narrow portion 34 is formed with a rectangular shape in transverse cross section by a pair of confronting planar surfaces 38, 40 connected to the curved surface 36.

Figure 2:
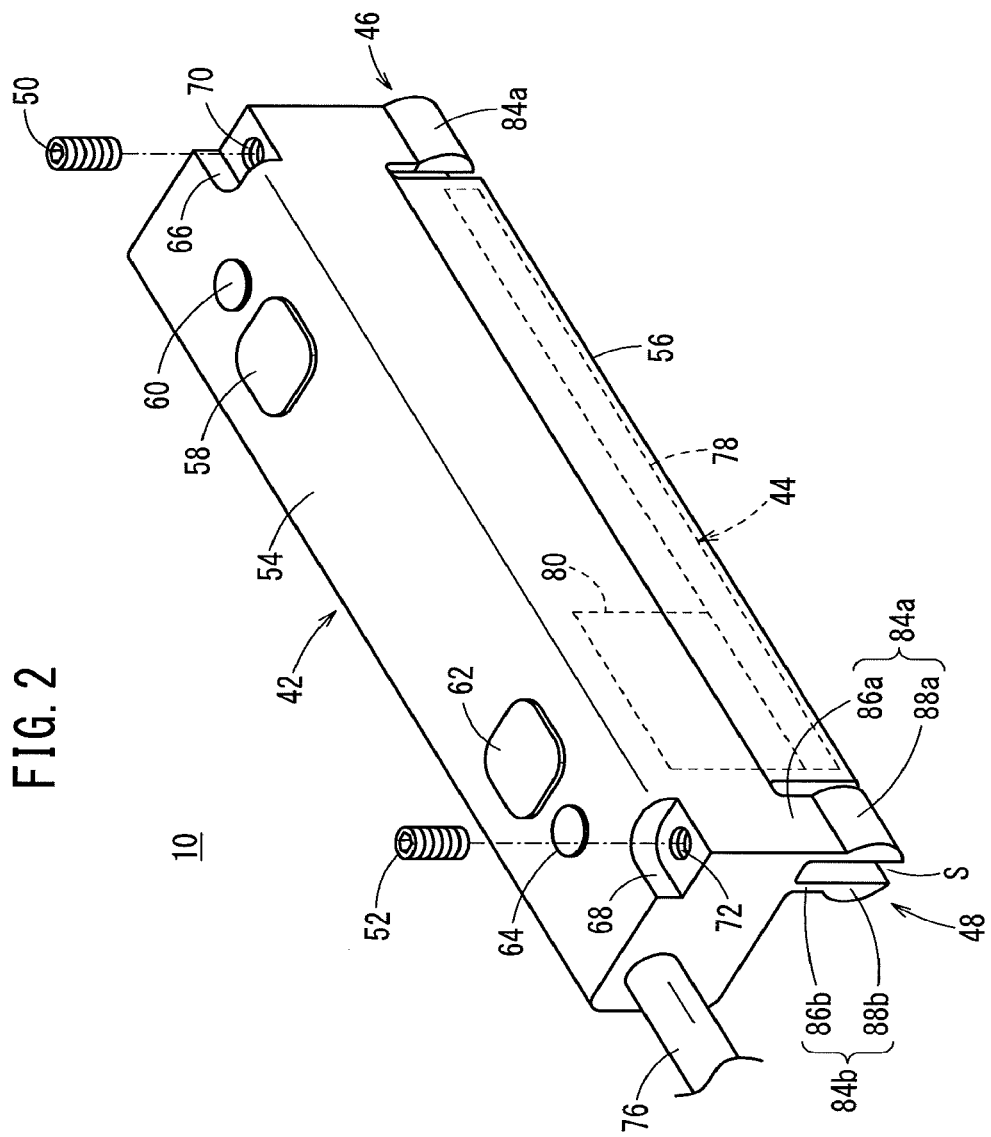
FIG. 2 is a perspective view of the position detecting sensor of FIG. 1.

Next, a description will be made concerning the structure of the position detecting sensor 10. As shown in FIG. 1, the position detecting sensor 10 is mounted and used in a sensor attachment groove 30 of the cylinder device 12. As shown in FIGS. 2 to 3B, the position detecting sensor 10 is equipped with an elongate housing 42, a sensor main body 44 accommodated in the housing 42, two mounting members 46, 48 provided on the housing 42 and which are inserted into the sensor attachment groove 30, and two fixing screws (fixing tools) 50, 52.

The housing 42 and the two mounting members 46, 48 are formed together integrally by a resin material. The housing 42 includes a housing main body 54 formed with a substantially rectangular parallelepiped shape, and a sensor arrangement section 56 disposed in the housing main body 54. The housing main body 54 extends in one direction.

When the position detecting sensor 10 is mounted in the sensor attachment groove 30, on an outer surface of the housing main body 54 that is oriented on an opposite side from the cylinder tube 14, there are provided a first operating unit 58, a first display unit 60, a second operating unit 62, and a second display unit 64. The first operating unit 58 and the first display unit 60 are located on one end side of the housing main body 54, and the second operating unit 62 and the second display unit 64 are located on another end side of the housing main body 54.

Each of the first operating unit 58 and the second operating unit 62, respectively, serves to set positions of the piston that are desired to be detected, and is constituted by buttons (switches) which are capable of being operated by being pressed by the user. Each of the first display unit 60 and the second display unit 64 is constituted, for example, as an LED display.

On the outer side surface of the housing main body 54, two recesses 66, 68 are formed, which are formed by cutting out two mutually opposing corner portions in the longitudinal direction. Penetrating holes 70, 72, which extend in a thickness direction of the housing main body 54, are formed in bottom surfaces of the respective recesses 66, 68. Female screw threads, which are screw-engaged with fixing screws 50, 52, are formed in each of the penetrating holes 70, 72 (see FIG. 4). On one end surface of the housing main body 54, a lead line 76 is provided, which is connected electrically to the sensor main body 44.

The mounting member 46 is formed to project on a rear side of the recess 66 within a bottom surface of the housing main body 54, whereas the mounting member 48 is formed to project on a rear side of the recess 68 within the bottom surface of the housing main body 54. Further, the sensor arrangement section 56 is formed to project between the mounting member 46 and the mounting member 48 within the bottom surface of the housing main body 54.

The sensor arrangement section 56 extends along the longitudinal direction, continuing from a location in the vicinity of the mounting member 46 positioned on one end of the housing main body 54 to a location in the vicinity of the mounting member 48 positioned on the other end of the housing main body 54.

A width dimension W1 of the sensor arrangement section 56 is set somewhat smaller than the groove width W2 of the narrow portion 34 of the sensor attachment groove 30, and a projecting length L1 of the sensor arrangement section 56 is set to be the same as the groove depth L2 or somewhat shorter than the groove depth L2 of the sensor attachment groove 30 (see FIGS. 3B and 4). A side surface of the sensor arrangement section 56 and the side surface of the housing main body 54 are coplanar.

The sensor main body 44 includes a magnetic detector 78 that detects magnetism of the magnet installed on the piston, and a controller 80 in which circuitry of a signal processing system is incorporated (see FIGS. 2 through 3B). The magnetic detector 78 is accommodated on a distal end side of the sensor arrangement section 56, and includes a plurality of non-illustrated magnetic sensors therein. The magnetic detector 78 is formed to be slightly longer than the stroke length of the piston, in order to linearly detect a displacement condition of the piston, which is operated reciprocally, spanning from one end to the other end in the interior of the cylinder tube 14.

The controller 80 stores output signals from the magnetic detector 78 when the first operating unit 58 and the second operating unit 62 are operated. The controller 80 judges whether or not the piston is positioned at a first set position (e.g., a stopped position on one end side of the cylinder tube 14), which is set by operating the first operating unit 58 on the basis of the output signals from the magnetic detector 78. The controller 80 turns on the first display unit 60 if it is judged that the piston is located at the first set position, and turns off the first display unit 60 if it is judged that the piston is not located at the first set position.

The controller 80 also judges whether or not the piston is positioned at a second set position (e.g., a stopped position on another end side of the cylinder tube 14), which is set by operating the second operating unit 62 on the basis of the output signals from the magnetic detector 78. The controller 80 turns on the second display unit 64 if it is judged that the piston is located at the second set position, and turns off the second display unit 64 if it is judged that the piston is not located at the second set position.

As shown in FIGS. 2 through 4, the mounting member 46 includes a first engagement part 84*a* and a second engagement part 84*b* disposed on the housing main body 54, which are flexible and are arranged in confronting relation, opening with a gap S mutually therebetween in a widthwise direction of the housing main body 54 (widthwise direction of the sensor attachment groove 30).

The first engagement part 84*a* comprises a first extension 86*a* that extends in a straight line from the bottom surface of the housing main body 54, and a first bulging part 88*a* provided on a distal end of the first extension 86*a*, and which bulges outwardly on a side opposite to the second engagement part 84*b*.

The first engagement part 84*a* includes a planar first inner surface (first confronting surface) 90*a* (see FIG. 3B) extending from the bottom surface of the housing main body 54 to the distal end of the first bulging part 88*a* and confronting the second engagement part 84*b*, a planar first outer surface 92*a* directed toward a side opposite from the second engagement part 84*b*, and a first curved surface 94*a* extending in an arcuate shape on a side opposite to the second engagement part 84*b* from a distal end of the first outer surface 92*a* and terminating at the distal end of the first inner surface 90*a*. The first curved surface 94*a* has a shape corresponding to the curved surface 36 of the wide portion 32 of the sensor attachment groove 30.

The second engagement part 84*b* comprises a second extension 86*b* that extends in a straight line from the bottom surface of the housing main body 54, and a second bulging part 88*b* provided on a distal end of the second extension 86*b*, and which bulges outwardly on a side opposite to the first engagement part 84*a*.

The second engagement part 84*b* includes a planar second inner surface (second confronting surface) 90*b* (see FIG. 3B) extending from the bottom surface of the housing main body 54 to the distal end of the second bulging part 88*b* and confronting the first engagement part 84*a*, a planar second outer surface 92*b* directed toward a side opposite from the first engagement part 84*a*, and a second curved surface 94*b* extending in an arcuate shape on a side opposite to the first engagement part 84*a* from a distal end of the second outer surface 92*b* and terminating at the distal end of the second inner surface 90b. The second curved surface 94b has a shape corresponding to the curved surface 36 of the wide portion 32 of the sensor attachment groove 30.

In a condition (reference state) in which the first engagement part 84a and the second engagement part 84b are not flexed, a distance (interval of the gap S) D1 between the first inner surface 90a and the second inner surface 90b is set such that the first inner surface 90a and the second inner surface 90b can pass through the narrow portion 34 by flexing the first bulging part 88a and the second bulging part 88b in directions to approach one another mutually.

In the reference state, a distance D2 between the first outer surface 92a and the second outer surface 92b is set substantially the same as the groove width W2 of the narrow portion 34. Further, in the reference state, a distance D3 (maximum distance) between a site bulging most prominently on the first curved surface 94a and a site bulging most prominently on the second curved surface 94b is set to be greater than the groove width W2 of the narrow portion 34. Stated otherwise, the mounting member 46 includes a width dimension that is greater than the groove width W2 of the narrow portion 34 of the sensor attachment groove 30.

On the first inner surface 90a, female screw threads 96a that engage with the fixing screw 50 are formed to span across the total length of the first inner surface 90a, and on the second inner surface 90b, female screw threads 96b that engage with the fixing screw 50 are formed to span across the total length of the second inner surface 90b. The female screw threads (retaining members 96a, 96b) connect with the female screw threads of the penetrating holes 70. The mounting member 48 is constituted in the same manner as the mounting member 46, and therefore, detailed description of the mounting member 48 is omitted.

The position detecting sensor 10 according to the present invention is constructed basically as described above. Next, advantages and effects of the position detecting sensor 10 will be described. In an initial state, the fixing screw 50 is engaged with the penetrating hole 70 of the housing main body 54, and the fixing screw 52 is engaged with the penetrating hole 72 of the housing main body 54.

First, as shown in FIG. 4, the position detecting sensor 10 is arranged in an arbitrary one of the sensor attachment grooves 30, such that the respective mounting members 46, 48 confront the openings in the sensor attachment groove 30 of a side surface 14a of the cylinder tube 14.

Figure 5A:
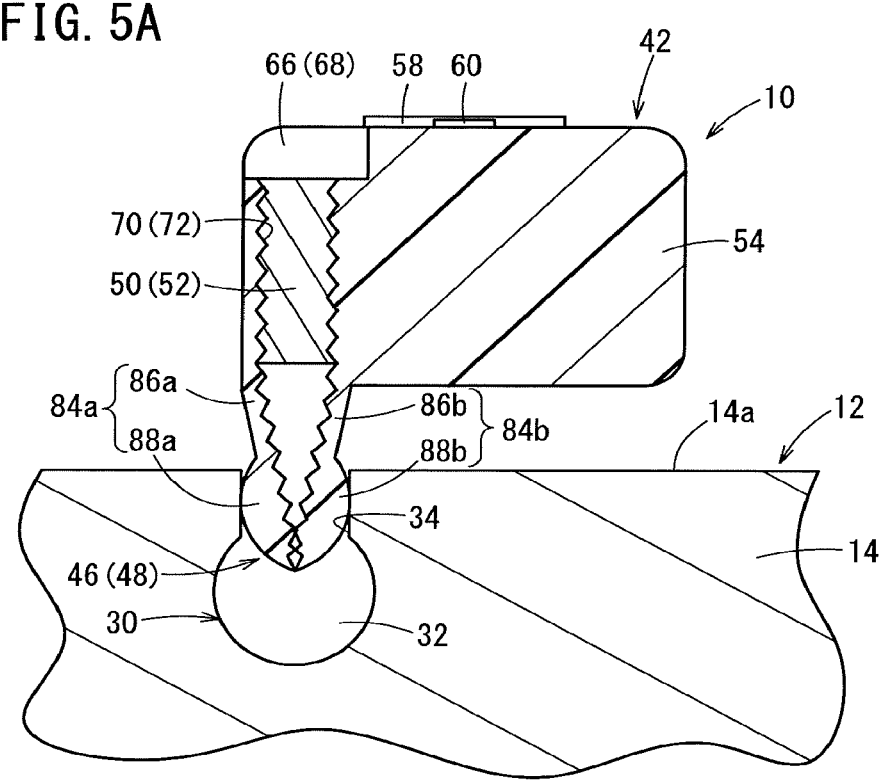
FIG. 5A is a second explanatory drawing of the mounting procedure.

Next, in a state in which the first curved surface 94a and the second curved surface 94b of the respective mounting members 46, 48 are placed in contact with edge parts of the opening of the sensor attachment groove 30, the position detecting sensor 10 is pressed toward the side of the wide portion 32 (groove bottom surface) of the sensor attachment groove 30. Upon doing so, the first engagement part 84a and the second engagement part 84b are pressed and flexed by the opening edge parts of the sensor attachment groove 30 in directions to approach one another mutually, and are inserted into the narrow portion 34 of the sensor attachment groove 30 (see FIG. 5A).

Figure 5B:
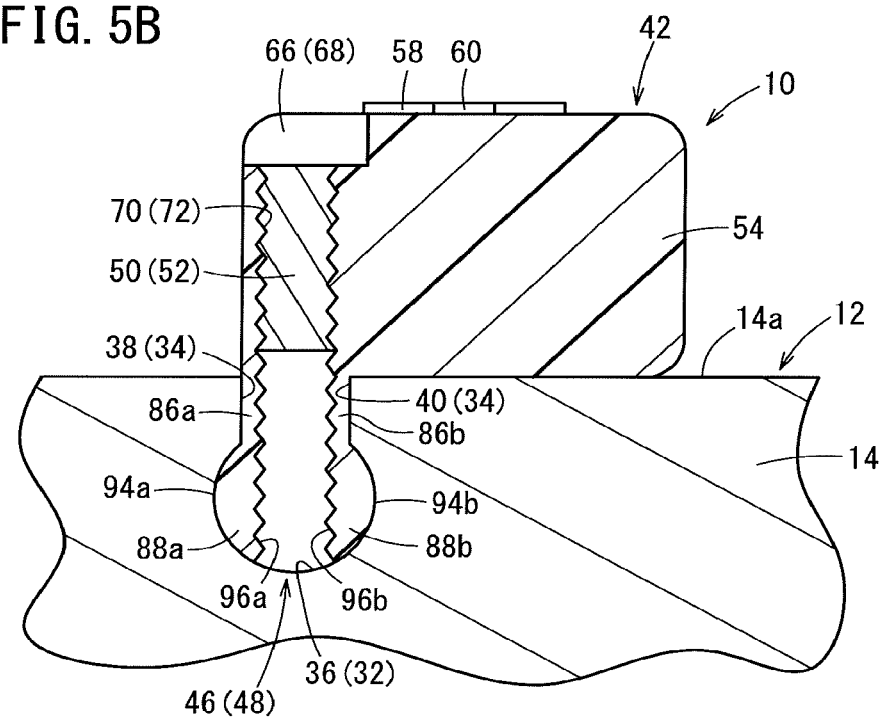
FIG. 5B is a third explanatory drawing of the mounting procedure.

At this time, the first curved surface 94a is placed in contact with the planar surface 38 of the narrow portion 34, and the second curved surface 94b is placed in contact with the planar surface 40 of the narrow portion 34. In addition, upon each of the mounting members 46, 48 being pressed toward the side of the wide portion 32, the first bulging part 88a and the second bulging part 88b pass through the narrow portion 34. Upon doing so, a force that acts on the first engagement part 84a from the planar surface 38, and a force that acts on the second engagement part 84b from the planar surface 40 are released, whereupon the first engagement part 84a and the second engagement part 84b are restored to their original state of being separated in directions mutually away from each other by a restoring force (elastic force) thereof (see FIG. 5B).

More specifically the first bulging part 88a and the second bulging part 88b are positioned inside the wide portion 32 of the sensor attachment groove 30, and together therewith, the first extension 86a and the second extension 86b become positioned inside the narrow portion 34 of the sensor attachment groove 30. Stated otherwise, insertion of the respective mounting members 46 48 into the sensor attachment groove 30 is completed.

At this time, the maximum distance D3 between the first curved surface 94a and the second curved surface 94b is greater than the groove width W2 of the narrow portion 34. Therefore, even in the case that the position detecting sensor 10 is mounted from vertically below the sensor attachment groove 30, or if a user's hand or the like strikes the position detecting sensor 10, disengagement or falling out of the respective mounting members 46, 48 from the sensor attachment groove 30 can be prevented.

Further, the first curved surface 94a and the second curved surface 94b, respectively, contact the curved surface 36, while in addition, the first outer surface 92a contacts the planar surface 38, and the second outer surface 92b contacts the planar surface 40. In other words, the position detecting sensor 10 is tentatively fixed with respect to the cylinder tube 14. Therefore, positional shifting of the position detecting sensor 10 with respect to the cylinder tube 14 can be suppressed.

However, in this state, at least any one from among the first curved surface 94a, the second curved surface 94b, the first outer surface 92a, and the second outer surface 92b may not necessarily come into contact with the wall surfaces (the curved surface 36 and the respective planar surfaces 38, 40) that make up the sensor attachment groove 30.

Figure 6:
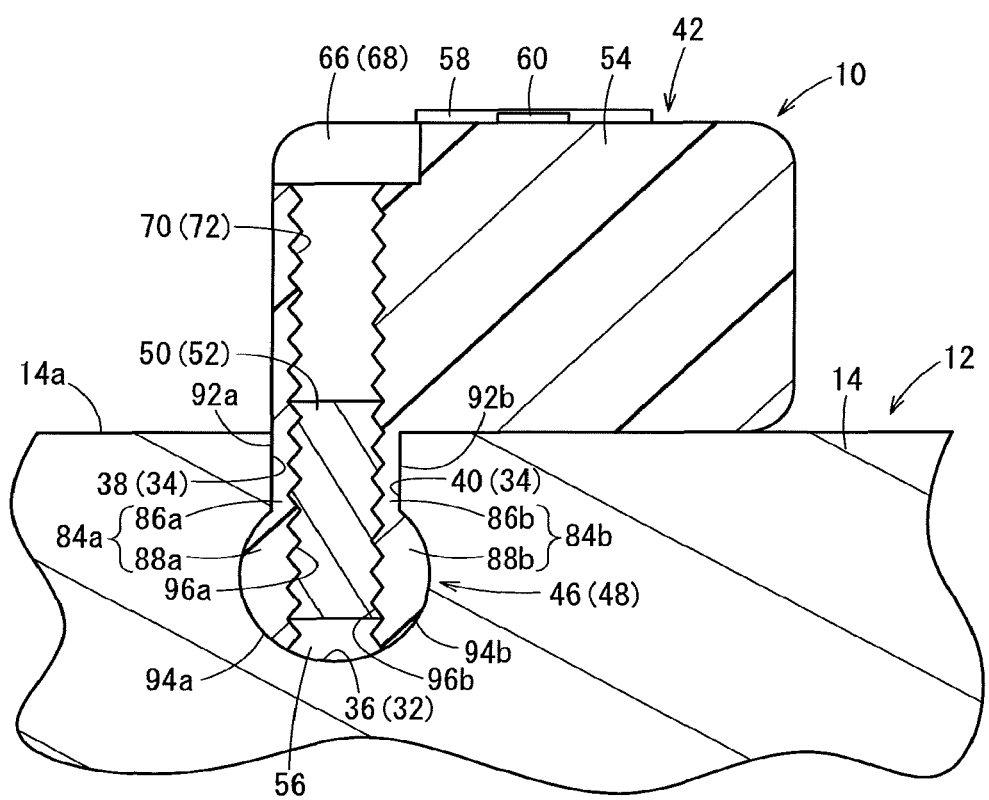
FIG. 6 is a fourth explanatory drawing of the mounting procedure.

Next, using a non-illustrated tool such as a driver or the like, the fixing screw 50 is advanced and engaged with the female screw threads 96a, 96b of the mounting member 46, and the fixing screw 52 is advanced and engaged with the female screw threads 96a, 96b of the mounting member 48 (see FIG. 6). Upon doing so, the first engagement part 84a and the second engagement part 84b are pressed in directions to separate mutually away from each other by the fixing screws 50, 52.

More specifically, the first curved surface 94a and the second curved surface 94b are pressed against the curved surface 36, the first outer surface 92a is pressed against the planar surface 38, and the second outer surface 92b is pressed against the planar surface 40. Therefore, the position detecting sensor 10 is fixed firmly with respect to the cylinder tube 14. In other words, attachment of the position detecting sensor 10 on the cylinder device 12 is completed.

In a state with the position detecting sensor 10 being mounted on the cylinder device 12, a distal end surface of the sensor arrangement section 56 is placed in contact with the curved surface 36 of the sensor attachment groove 30. More specifically, the magnetic detector 78 is positioned in the interior of the sensor attachment groove 30. Accordingly, since the distance between the magnetic detector 78 and the piston (magnet thereof) can be relatively close, the detection accuracy of the position detecting sensor 10 can be enhanced.

At a time that the position detecting sensor 10 is to be taken out from the sensor attachment groove 30, a procedure may be performed in an opposite manner to that used when the position detecting sensor 10 was mounted in the sensor attachment groove 30.

More specifically, at first, using the tool, the fixing screw 50 is retracted and positioned inside the penetrating hole 70, and the fixing screw 52 is retracted and positioned inside the penetrating hole 72. Next, the position detecting sensor 10 is pulled on so as to disengage the respective mounting members 46, 48 from the sensor attachment groove 30. Upon doing so, the first engagement part 84a and the second engagement part 84b are pressed and flexed in directions to approach each other by the boundary sites between the respective planar surfaces 38, 40 and the curved surface 36, and the first bulging part 88a and the second bulging part 88b are inserted into the narrow portion 34.

Thereafter, when the position detecting sensor 10 is pulled further, the first bulging part 88a and the second bulging part 88b pass through the narrow portion 34. In addition, a force that acts on the first engagement part 84a from the planar surface 38, and a force that acts on the second engagement part 84b from the planar surface 40 are released, whereupon the first engagement part 84a and the second engagement part 84b are restored to their original state of being separated in directions mutually away from each other by a restoring force thereof. Consequently, the position detecting sensor 10 is removed from the sensor attachment groove 30.

In accordance with the above configuration, in a state in which the first engagement part 84a and the second engagement part 84b are flexed in such a manner that the first engagement part 84a and the second engagement part 84b approach one another mutually, by being restored to their original positions after insertion thereof into the sensor attachment groove 30 from the side surface 14a of the cylinder tube 14, the position detecting sensor 10 can be attached and mounted with respect to the cylinder device 12. Owing thereto, mounting of the position detecting sensor 10 can be carried out easily and efficiently with respect to the cylinder device 12, without the need for a large operating space in the vicinity of an end of the cylinder tube 14 in the axial direction.

Further, the fixing screws 50, 52 are disposed in the gap S between the first engagement part 84a and the second engagement part 84b, whereby the first engagement part 84a and the second engagement part 84b are pressed in directions to separate away from each other. Therefore, the position detecting sensor 10 can be fixed more reliably and stably with respect to the cylinder device 12. Further, flexure of the first engagement part 84a and the second engagement part 84b in directions to approach one another can be suppressed by the fixing screws 50, 52.

According to the present embodiment, since the penetrating holes 70, 72 are formed in the housing 42 for guiding the fixing screws 50, 52 into the gap S between the first engagement part 84a and the second engagement part 84b, the fixing screws 50, 52 can easily be disposed in the gap S.

Further, since the female screw threads 96a, 96b that engage with the fixing screws 50, 52 are formed respectively in the first inner surface 90a and the second inner surface 90b, the fixing screws 50, 52 can be retained reliably between the first engagement part 84a and the second engagement part 84b.

Furthermore, the first bulging part 88a provided on the distal end of the first extension 86a bulges outwardly on a side opposite to the second engagement part 84b, and the second bulging part 88b provided on the distal end of the second extension 86b bulges outwardly on a side opposite to the first engagement part 84a. Therefore, disengagement of the respective mounting members 46, 48 from the sensor attachment groove 30 can suitably be suppressed.

According to the present embodiment, the first curved surface 94a is formed on the first bulging part 88a, and the second curved surface 94b is formed on the second bulging part 88b. Therefore, in a state in which the first curved surface 94a and the second curved surface 94b are placed in contact with edge parts of the opening of the sensor attachment groove 30, by pressing the mounting members 46, 48 toward the sensor attachment groove 30, the mounting members 46, 48 can be inserted easily into the interior of the sensor attachment groove 30. Further, the mounting members 46, 48 can easily be taken out from the sensor attachment groove 30 by pulling out the mounting members 46, 48 that are arranged inside the sensor attachment groove 30.

Furthermore, since the mounting members 46, 48 are disposed on both opposite ends in the longitudinal direction of the housing main body 54, the position detecting sensor 10 can be fixed more reliably and stably with respect to the cylinder device 12.

According to the present embodiment, since the sensor arrangement section 56 is positioned between the two mounting members 46, 48, positional shifting of the sensor arrangement section 56 (magnetic detector 78) with respect to the cylinder tube 14 can suitably be suppressed.

Figure 7:
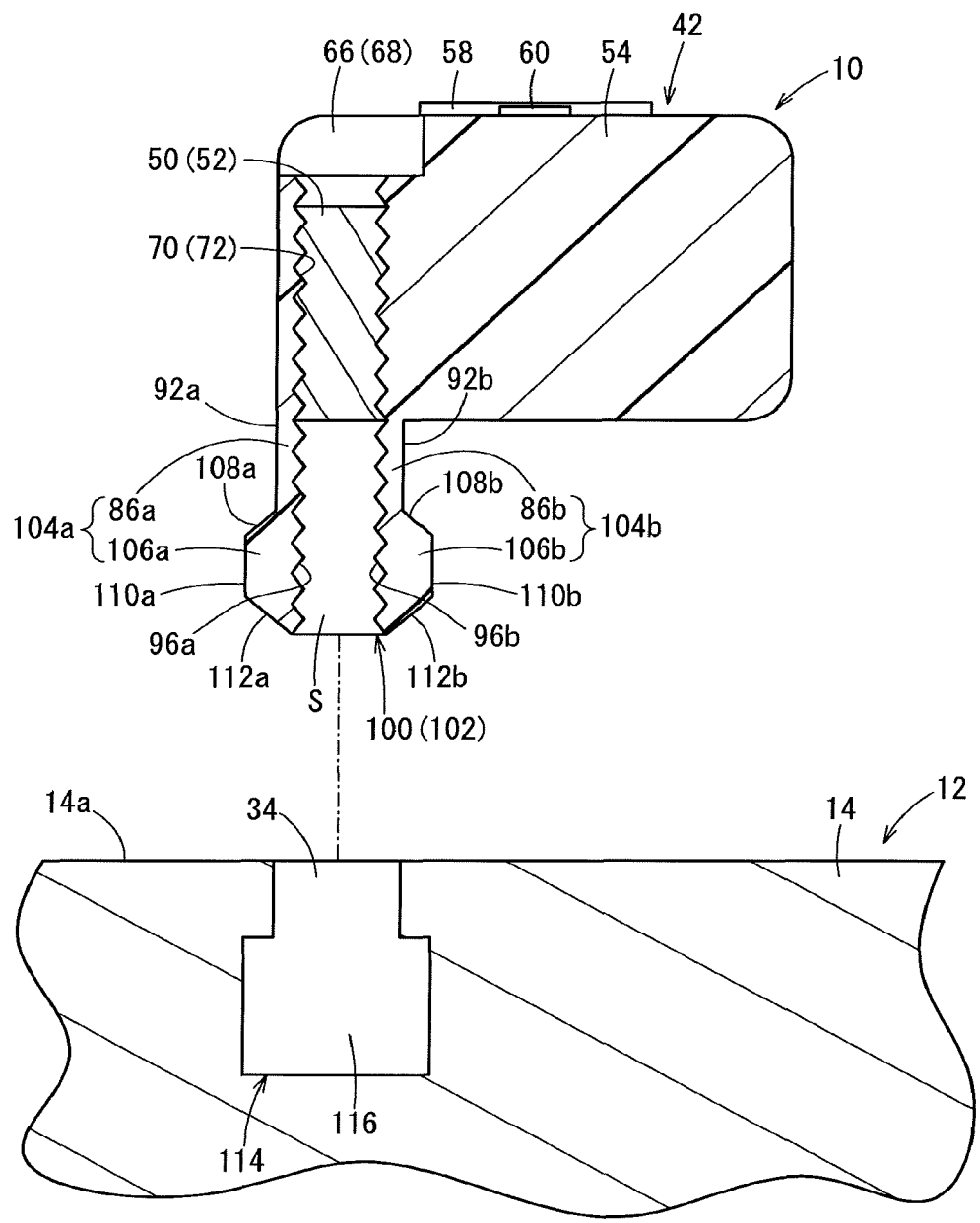
FIG. 7 is a transverse cross-sectional view with partial omission of a position detecting sensor equipped with a mounting member according to a modification.

Instead of the mounting members 46, 48, the position detecting sensor 10 according to the present embodiment may include the mounting members 100, 102 according to a modification as shown in FIG. 7. The first bulging part 106a that makes up the first engagement part 104a of the mounting member 100 includes a first tapered surface 108a, a first planar surface 110a, and a second tapered surface 112a.

The first tapered surface 108a is inclined toward the distal end side of the first outer surface 92a and toward an opposite side from the second engagement part 104b. The first planar surface 110a extends to the distal end side from the first tapered surface 108a along the direction in which the penetrating hole 70 extends. The second tapered surface 112a is inclined toward the distal end side of the first planar surface 110a and toward the side of the second engagement part 104b.

The second bulging part 106b of the mounting member 100 includes a third tapered surface 108b, a second planar surface 110b, and a fourth tapered surface 112b. The third tapered surface 108b is inclined toward the distal end side from the second outer surface 92b and toward an opposite side from the first engagement part 104a. The second planar surface 110b extends from the third tapered surface 108b to the distal end side along the direction in which the penetrating hole 70 extends. The fourth tapered surface 112b is inclined toward the distal end side from the second planar surface 110b and toward the side of the first engagement part 104a.

The mounting member 102 is constituted in the same manner as the mounting member 100, and therefore, detailed description of the mounting member 102 is omitted. Further, the transverse cross section of the wide portion 116 of the sensor attachment groove 114 is formed in a rectangular shape. In accordance with such a structure as well, the same advantages and effects as those discussed previously can be accomplished.

The position detecting sensor according to the present invention is not limited to the embodiment described above, and it is a matter of course that various modified or additional configurations could be adopted therein without departing from the essential scope of the present invention.

For example, although according to the present embodiment, a cylinder device using a pressure fluid has been exemplified as the actuator, the invention is not limited to such a cylinder device, and an electric actuator can also be used. Further, the principles of the invention can also be applied to a linear guide.

What is claimed is:

1. A mounting structure of a position detecting sensor mounted in a sensor attachment groove that opens on a side surface of an actuator and extends along an axial direction of the actuator, the sensor attachment groove including a wide portion on a groove bottom surface side, and a narrow portion on a side surface side of the actuator, the position detecting sensor comprising:
    a housing that extends in one direction and in which there is accommodated a sensor main body that detects a position of a displaceable body of the actuator; and
    a mounting member provided on the housing, and having a width dimension larger than a groove width of the narrow portion of the sensor attachment groove; wherein
    the mounting member includes a first engagement part and a second engagement part, which are flexible and are arranged facing each other, opening with a gap mutually therebetween in a widthwise direction of the sensor attachment groove,
    the housing comprises
        a housing main body, and
        a sensor arrangement section provided on the housing main body at a position between two mounting members, and in which the sensor main body is arranged,
    the respective mounting members are disposed respectively on opposite ends in the longitudinal direction of the housing, and
    the sensor arrangement section is formed to be insertable into the interior of the sensor attachment groove from the side surface side of the actuator, so that the sensor main body is positioned inside the sensor attachment groove.

2. The mounting structure of the position detecting sensor according to claim 1, further comprising a fixing tool arranged in the gap, and which presses the first engagement part and the second engagement part in directions to separate away from each other.

3. The mounting structure of the position detecting sensor according to claim 2, wherein a penetrating hole configured to guide the fixing tool toward the gap is formed in the housing.

4. The mounting structure of the position detecting sensor according to claim 3, wherein retaining members configured to retain the fixing tool are provided respectively on a first confronting surface within the first engagement part and confronting the second engagement part, and a second confronting surface within the second engagement part and confronting the first engagement part.

5. The mounting structure of the position detecting sensor according to claim 1, wherein:
    the first engagement part includes:
        a first extension that extends in a straight line from the housing; and
        a first bulging part provided on a distal end of the first extension, and which bulges outwardly on a side opposite to the second engagement part; and
    the second engagement part includes:
        a second extension that extends in a straight line from the housing; and
        a second bulging part provided on a distal end of the second extension, and which bulges outwardly on a side opposite to the first engagement part.

6. The mounting structure of the position detecting sensor according to claim 5, wherein transverse cross sections of the first bulging part and the second bulging part have respective arc-shaped curved surfaces.

* * * * *